US006775280B1

(12) United States Patent
Ma et al.

(10) Patent No.: US 6,775,280 B1
(45) Date of Patent: Aug. 10, 2004

(54) METHODS AND APPARATUS FOR ROUTING PACKETS USING POLICY AND NETWORK EFFICIENCY INFORMATION

(75) Inventors: Qingming Ma, Santa Clara, CA (US); John G. Waclawsky, Fredrick, MD (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/302,311

(22) Filed: Apr. 29, 1999

(51) Int. Cl.[7] .............................................. H04L 12/56
(52) U.S. Cl. ...................................... 370/392; 370/230
(58) Field of Search ................................. 370/229, 230, 370/232, 234, 237, 238, 238.1, 352, 353, 354, 355, 356, 357, 389, 400, 409, 464, 469, 471, 902, 905, 392; 709/236, 240

(56) References Cited

U.S. PATENT DOCUMENTS

| | | | | |
|---|---|---|---|---|
| 4,621,359 | A | * 11/1986 | McMillen ..................... | 370/60 |
| 5,901,140 | A | * 5/1999 | Van As et al. ............... | 370/236 |
| 5,920,705 | A | * 7/1999 | Lyon et al. .................. | 370/409 |
| 5,999,518 | A | 12/1999 | Nattkemper et al. ......... | 370/258 |
| 5,999,525 | A | 12/1999 | Krishnaswamy et al. ... | 370/352 |
| 6,055,571 | A | 4/2000 | Fulp et al. ................... | 709/224 |
| 6,104,700 | A | * 8/2000 | Haddock et al. ............ | 370/235 |
| 6,111,673 | A | * 8/2000 | Chang et al. ................ | 359/123 |
| 6,154,776 | A | * 11/2000 | Martin ......................... | 709/226 |
| 6,157,955 | A | 12/2000 | Narad et al. ................. | 709/228 |
| 6,167,445 | A | 12/2000 | Gai et al. ..................... | 709/223 |
| 6,170,009 | B1 | * 1/2001 | Mandal et al. .............. | 709/223 |
| 6,205,149 | B1 | * 3/2001 | Lemaire et al. ............. | 370/401 |
| 6,243,360 | B1 | * 6/2001 | Basilico ....................... | 370/231 |
| 6,262,974 | B1 | * 7/2001 | Chevalier et al. ........... | 370/232 |
| 6,310,881 | B1 | * 10/2001 | Zikan et al. ................. | 370/401 |
| 6,330,614 | B1 | * 12/2001 | Aggarwal et al. ..... | 340/825.52 |
| 6,377,579 | B1 | * 4/2002 | Ofek ....................... | 370/395.4 |
| 6,400,681 | B1 | * 6/2002 | Bertin et al. ................. | 370/218 |
| 6,473,424 | B1 | * 10/2002 | DeJager et al. ............. | 370/389 |

OTHER PUBLICATIONS

Clark et al. "Explicit Allocation of Best–Effort Packet Delivery Service". IEEE. Aug. 1998. pp. 362–373.*
Blake et al. "RFC 2475: An Architecture for Differentrial Services". IEEE. Dec. 1998. pp. 1–36.*
Adiseshu et al. "A State Management Protocol for IntServ, Diffserv, and Label Switching". IEEE Network Protocols. Oct. 13–16, 1998, pp. 13–16.*
Hagard et al. "Multiprotocol label switching in ATM networks". Ericsson Review No. 1, 1998 (created Sep. 15, 1998). pp. 32–39.*
Davie et al. "Explicit Route Support in MPLS". Network Working Group. Internet Draft: draft–davie–mpls–explicit–routes–00.txt. Nov., 1997, pp. 1–2.*
Swallow et al. "Multiprotocol Label Switching (mpls)". $40^{th}$ IETF Meeting in Washington, D.C. Dec. $8^{th}$, 1997.*
"Quality–of–Service Routing in Integrated Services Networks" by Qingming Ma, dated Jan. 1998, published May 1998, Carnegie Mellon University, CMU–CS–98–138.

* cited by examiner

*Primary Examiner*—Chi Pham
*Assistant Examiner*—Derrick W Ferris
(74) *Attorney, Agent, or Firm*—Chapin & Huang, L.L.C.; David E. Huang, Esq.

(57) ABSTRACT

A technique routes packets in a data communications device having multiple output ports. The technique involves obtaining, from a network, data having an associated quality of service (QoS). The technique additionally involves choosing one of the multiple output ports of the data communications device based on the associated QoS of the data, a pre-established policy, and network efficiency information for the multiple output ports. The technique further involves transmitting the data to the network through the chosen one of the multiple output ports.

41 Claims, 5 Drawing Sheets

METHODS AND APPARATUS FOR ROUTING PACKETS USING POLICY AND NETWORK EFFICIENCY INFORMATION

BACKGROUND OF THE INVENTION

A typical data communications network includes multiple host computers that are linked together by a combination of data communications devices and transmission media. In general, the host computers communicate by (i) packaging data using a standardized protocol or format such as a network packet or cell (hereinafter generally referred to as a packet), and (ii) exchanging the packaged data through the data communications devices and transmission media.

In some networks, the packaged data is classified into different Quality of Service (QoS) classes that dictate how competing traffic flows are provided resources. Such resource allocation affects how quickly the packaged data travels from a source to a destination. For example, a distinction may be drawn between packets carrying video data (i.e., video packets belonging to a video QoS class) and packets carrying general data (i.e., general data packets belonging to a general data QoS class such as Best Effort Service). In this arrangement, a data communications device routes video packets through a network differently than general data packets due to different link resource availability and resources being allocated differently based on the QoS class of the packets.

There are different types of QoS routing techniques. In one QoS routing technique (hereinafter called QoS class-prioritized routing), a data communications device internally prioritizes the processing of different QoS class packets in accordance with a pre-established QoS policy. For example, in accordance with one such QoS policy, a data communications device gives higher priority to video packets relative to general data packets. Accordingly, if the data communications device simultaneously receives a video packet and a general data packet (e.g., through multiple input ports), the QoS policy directs the device to process the video packet before the general data packet. As a result, in QoS class-prioritized routing, packet destinations (i.e., receiving host computers) generally perceive different responses, or Qualities of Service, for different QoS classes (e.g., faster video transmissions than general data transmissions).

In another QoS routing technique (hereinafter called load-directed routing), the data communications device generally directs packets through the network based on network load conditions. For example, suppose that the data communications device has multiple output ports to data paths that eventually lead to the same remote destination (i.e., the same receiving host computer). When the data communications device receives a video packet destined for that remote destination, the device transmits the video packet out the output port expected to lead to a low traffic area of the network. On the other hand, when the device receives a general data packet destined for the same remote destination, the device transmits the general data packet out a different output port expected to lead to a high traffic area of the network. With this arrangement, the video packet should travel through the network faster than the general data packet. Accordingly, the load-directed routing technique generally provides the same result as the QoS class-prioritized routing technique. That is, packet destinations (i.e., receiving host computers) generally perceive different Quality of Service or responses for different QoS classes (e.g., quicker video transmissions than general data transmissions).

SUMMARY OF THE INVENTION

In contrast to conventional quality of service (QoS) routing techniques that route data exclusively based on a QoS policy, or that route data exclusively based on load-balancing criteria, the invention is directed to techniques for routing data in a manner that simultaneously satisfies a QoS policy constraint, and a network efficiency constraint (e.g., load balancing). That is, embodiments of the invention provide load-balancing while, at the same time, satisfying QoS requirements.

One technique involves obtaining data from a network using a data communications device having multiple output ports. This technique further involves choosing one of the output ports based on an associated quality of service of the data, a pre-established QoS policy, and network efficiency information. The technique then involves transmitting the data to the network through the chosen output port. Accordingly, the technique satisfies both a QoS policy constraint as well as a network efficiency constraint.

Preferably, the data resides in a packet having a source field, a destination field and a QoS field. In this situation, the device scans the source and destination fields to determine the source and intended destination (e.g., host computers) of the packet. Alternatively, only the destination and QoS fields are used. Similarly, the device scans the QoS field of the packet to determine the associated QoS of the data. The associated QoS may be in the form of a number identifying a particular QoS class, a delay bound indicating a limit on the amount of time permitted for the data to travel from its source to its destination, a bandwidth requirement, a combination of such criteria or other criteria.

In one particular technique, the network efficiency information includes network load information describing network load conditions at the output ports of the data communications device. In one embodiment, the network load information is gathered and distributed among data communication devices within the network. That is, the data communications device that operates in accordance with the invention receives the network load information from neighboring devices that observe the local network environment. Alternatively, the network load information is acquired from traffic monitors that observe network traffic at the output ports.

With the network load information, the data communications device chooses one of the multiple output ports of the data communications device for data transmission. First, a policy stage of the data communications device selects, from a set of available network paths extending from the device, a set of QoS policy compliant network paths based on the associated QoS class of the data and the pre-established QoS policy. Next, using the network load information as a load distribution constraint, an efficiency stage of the device identifies one of the policy compliant network paths based on the associated QoS of the data and the network load information. The chosen output port is an output port through which the identified one of the set of policy compliant network paths passes.

It should be understood that each of the policy compliant network paths preferably extends from the data communications device to a designated destination identified by the destination field of the packet. Furthermore, each policy compliant network path preferably is capable of carrying the data (e.g., formatted as a packet) in accordance with the associated QoS of the packet.

Furthermore, for the above-described particular technique, it should be understood that the modularization of the data communications device's operation into a policy stage and an efficiency stage adds flexibility to the device. For example, one pre-established policy can be substituted with another in the policy stage without interfering with the operation of the efficiency stage. Similarly, different load balancing rules can be imposed in the efficiency stage without interfering with the operation of the policy stage. Accordingly, various policy and load balancing algorithms can be incorporated in the data communications device in order to optimize and customize its operation.

A thorough explanation of particular QoS policies and routing algorithms that are suitable for use by the invention are described in a thesis entitled, "Quality-of-Service Routing in Integrated Services Networks," by Qingming Ma, published May, 1999 (although dated January, 1998), Carnegie Mellon University, Pittsburgh, Pa., CMU-CS-98-138, the teachings of which are hereby incorporated by reference in their entirety.

Preferably, the data communications device receives the pre-established QoS policy from another data communications device in the network prior to choosing the output port. In particular, such a QoS policy preferably is conveyed through the transmission media linking the devices together within the network.

It should be understood that not every packet having an associated QoS needs to be routed in the above described manner. Rather, the data communication device preferably transmits packets of a best effort class through a predetermined output port without regard for the pre-established policy and the network efficiency information. For a packet of the best effort class, there is no guarantee that the packet will be delivered to its designated destination.

Similarly, according to one embodiment of the invention, for a packet that belongs to pre-established packet stream, the data communications device transmits the packet through a predetermined output port without regard for the pre-established policy and the network efficiency information.

It should be further understood that the choice of output ports can be based on other criteria as well as those identified above. For example, in one embodiment, the choice of output port is based further on network topology information including adjacent hop data and propagation delay data. Such other criteria can be imposed in different operating stages of the data communications device due to its modularity. For example, the topology criteria can be combined with the pre-established QoS policy within the policy stage. Alternatively, the topology criteria can be combined with load balancing rules in the efficiency stage. As another alternative, a separate topology criteria stage can be added. Accordingly, data communications devices configured in accordance with the invention provide improved flexibility for incorporating routing criteria that is superior to conventional devices that operate exclusively based on a QoS class-policy or exclusively based on load-balancing criteria.

One embodiment of the invention is directed to a computer program product that includes a computer readable medium having instructions stored thereon for routing data in a computerized data communications device having multiple output ports. The instructions, when processed by the computerized data communications device, cause the computerized data communications device to perform the steps of: obtaining data from a network, the data having an associated quality of service; choosing one of the multiple output ports of the data communications device based on the associated quality of service of the data, a pre-established policy, and network efficiency information for the multiple output ports; and, transmitting the data to the network through the chosen one of the multiple output ports.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

The invention is directed to techniques for routing data within a data communications device in a network in order to provide different Quality of Service (QoS) to host computers within the network. These techniques involve choosing one of multiple output ports of the data communications device through which to route the data. In general, the choice of output port satisfies both QoS policy and network efficiency constraints.

A QoS policy constraint is a QoS-related restriction on the choice of output port of the data communications device. That is, the choice of output port is based on achieving a particular QoS for a particular type of data. For example, the data communications device may be required to choose an output port that enables the intended destination of the data to receive the data within a particular amount of time associated with the QoS class of the data (i.e., within a particular delay bound). As another example, the device may be required to choose an output port such that the device achieves a particular bandwidth for a particular QoS class. As a result, the device may not be able to choose certain output ports due to those output ports being overworked or being incapable of providing a particular bandwidth (e.g., an output port that has already been assigned to provide 70% of its total bandwidth to video packets cannot provide 50% of the bandwidth to general data packets).

Similarly, a network efficiency constraint is a network efficiency-related restriction imposed on the choice of output port of the data communications device. That is, the choice of output port is dependent on efficiency aspects of the network. For example, the data communications device may be required to load-balance its output transmissions over all its output ports such that no particular output port becomes substantially overworked relative to the other output ports. In another example, the device chooses, for data of one QoS class, certain output ports having a certain traffic level, and for data of another QoS class, different output ports having a different traffic level. For instance, the device may send data of a best effort class (data for which there is no guarantee of delivery) through output ports connected to high traffic areas of the network, and data of a video QoS class through output ports connected to low traffic areas of the network. Accordingly, in view of the network efficiency constraint, the device may be limited to choosing only certain output ports.

Figure 1:
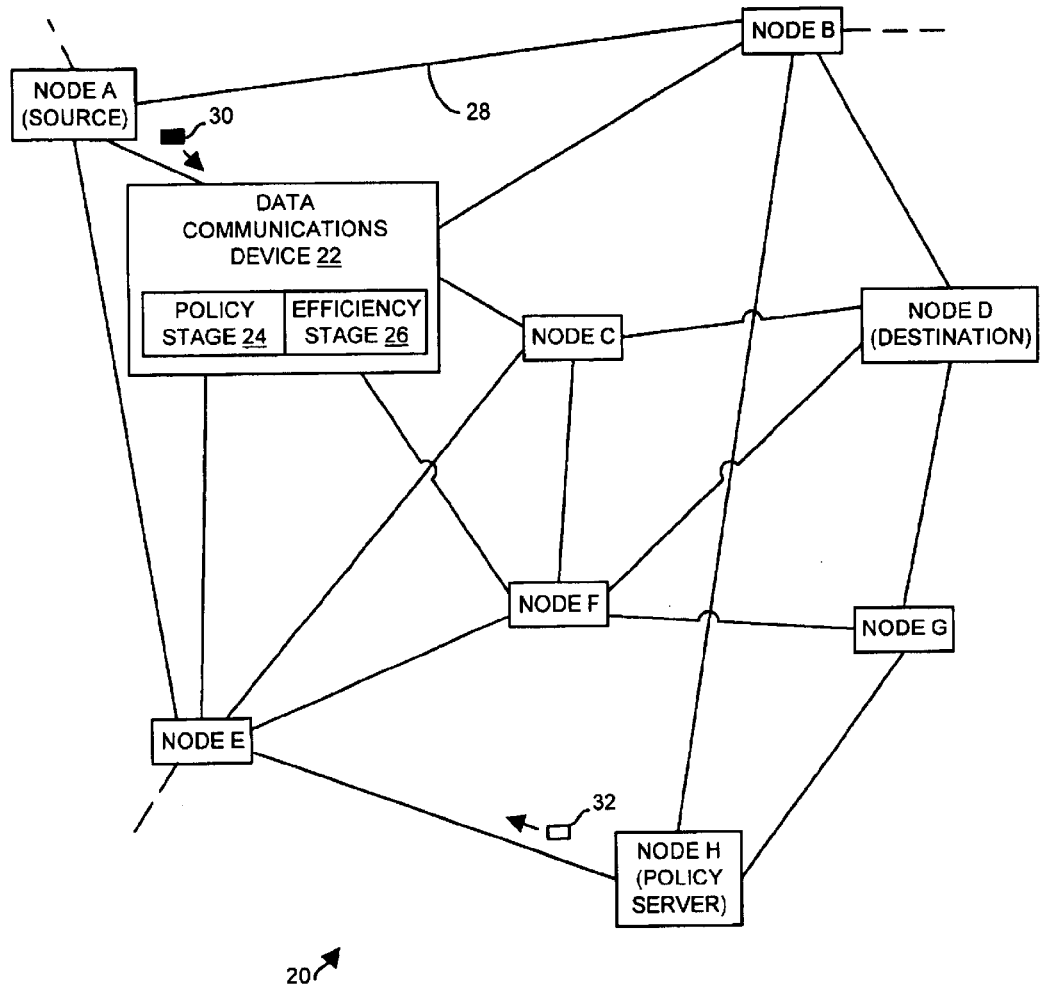
FIG. 1 is a block diagram of a data communications network that includes a data communications device configured according to the invention.

FIG. 1 shows an example network 20 that is suitable for use by the invention. The network 20 includes a variety of devices (e.g., host computers, routers, repeaters, etc.) that form nodes of the network 20 (e.g., NODE A, NODE B, NODE C, etc.). The network 20 further includes transmission media 28 that connect the nodes. The network 20 extends further, as depicted by the dashed lines extending from NODE A, NODE B and NODE E.

By way of example only, the transmission media 28 are in the form of network links (e.g., connections formed by fiber optical cable, electrical wire, wireless links, etc.) which extend between pairs of nodes. The nodes communicate by exchanging data through these network links. To this end, the nodes have input and output ports that connect to the links for receiving and transmitting data, respectively. One channel of the link transfers signals carrying data in one direction (from one of the pair of nodes to the other), and another channel of the link transfers signals carrying data in the opposite direction.

Preferably, the nodes package the data into a standard format such as packets, frames or cells (hereinafter generally referred to as packets), and pass the packaged data through the links in signal form (e.g., electrical, optical, radio frequency, etc.). For illustration purposes, FIG. 1 shows NODE A sending a packet 30 to another node along a physical network link (i.e., the transmission media 28). For convenience, the remainder of the description will explain the invention in the context of transferring data using packets. However, it should be understood that other mechanisms (e.g., wireless LAN's, ATM cells, circuit-switched techniques, etc.) are suitable and intended to be within the scope of the invention.

Suppose that NODE A is a host computer that originates the packet 30, and that NODE D is a host computer that is the intended last recipient of the packet 30. In this example, NODE A is called the "source" and NODE D is called the "destination" of the packet 30. In order for the packet 30 to travel from its source to its destination, the packet 30 must travel through the network 20, i.e., through the transmission media 28 and perhaps one or more intermediate nodes (or hops) interconnecting NODE A and NODE D.

One of the nodes of the network 20 is a data communications device 22 which is configured to operate in accordance with the invention. The data communications device 22 includes a policy stage 24 and an efficiency stage 26 that enable the device 22 to provide different Quality of Service to host computers (e.g., NODE D) by routing data in a manner that satisfies both QoS policy and network efficiency constraints. Preferably, other nodes of the network 20 (e.g., NODE C and NODE F), and perhaps all nodes that route, switch or transfer data, are similarly configured.

The QoS policy constraint is established by a policy that is preferably provided by an external node. In the example network 20, NODE H operates as a policy server that provides the policy to the data communications device 22. Preferably, the policy travels from the policy server (NODE H) to the device 22 within one or more network packets 32, as shown in FIG. 1.

For a packet to travel from its source to its destination within the network 20, the packet must travel through a "path". A path is a unique series of network nodes through which data can pass from source to destination. For example, if packet 30 has NODE A as its source and NODE D as its destination, packet 30 may traverse a first path consisting of NODE A, the data communications device 22, NODE C and NODE D to ultimately reach its destination (NODE D). Alternatively, the packet 30 can travel through a second path consisting of NODE A, the data communications device 22, NODE F and NODE D to reach its destination.

There are other possible paths suitable for carrying the packet 30 to its destination, and such paths do not necessarily include the same number of nodes. For example, a third path consists of NODE A, the data communications device 22, NODE B, NODE H, NODE G and NODE D. This third path has two nodes more than the each of the first and second paths described above.

Moreover, due to the layout (or topology) of the example network 20, it is not necessary that the packet 30 travel through the data communications device 22. For example, a fourth possible path for the packet 30 may consist of NODE A, NODE B and NODE D. However, since the data communications device 22 is configured in accordance with the invention, it makes sense to further consider paths that include the device 22.

Figure 2:
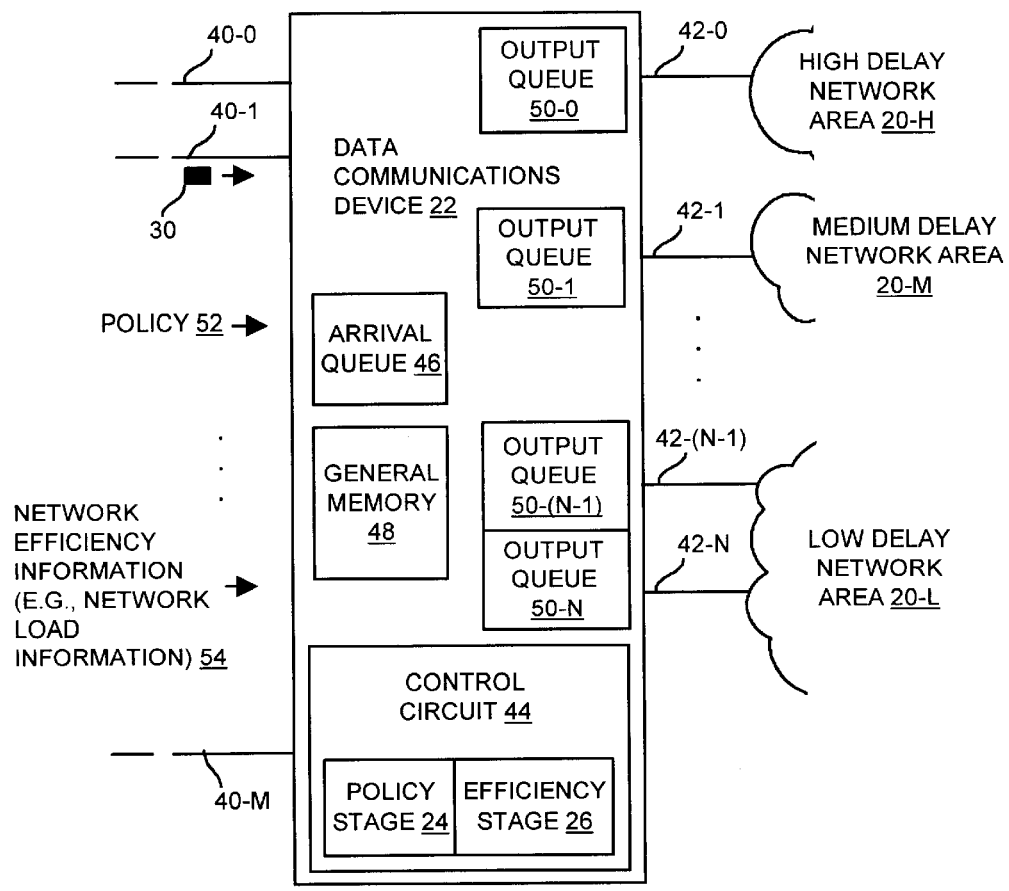
FIG. 2 is a more detailed block diagram of the data communications device of FIG. 1.

Further details of the data communications device 22 will now be provided with reference to FIG. 2. The device 22 includes multiple input ports 40-0, . . . , 40-M (collectively input ports 40), multiple output ports 42-0, . . . , 42-N (collectively output ports 42), a multi-stage control circuit 44, an arrival queue 46, general memory 48, and output queues 50-0, . . . , 50-N (collectively output queues 50). Preferably, when the device 22 directly connects with another node, the device 22 connects an input port 40 to an output port of the other node, and an output port 42 with an input port of a different other node. Accordingly, in one embodiment, there are an equal number of input ports 40 and output ports 42 (i.e., M equals N) for the device 22.

It should be understood that, in the example network 20, the output ports 42 connect with different network areas having different levels of network traffic (e.g., bandwidth queue sizes). For example, port 42-0 connects with a high delay network area 20-H (e.g., an area of high bandwidth usage), port 42-1 connects with a medium delay network area 20-M (e.g., an area of moderate bandwidth usage), and ports 42-(N–1) and 42-N connect with a low delay network area 20-L (e.g., an are with minimal bandwidth usage).

The multi-stage control circuit 44 includes the policy stage 24 and the efficiency stage 26 (also see FIG. 1). In the example network 20, the policy stage 24 operates based on a policy 52 from a policy server (another node). The policy 52 is sent from NODE H within one or more packets 32.

The network efficiency stage 26 operates based on network efficiency information 54. Preferably, the network efficiency information 54 includes network load information describing the current traffic situations at the output queues 50 of the device 22. In one embodiment of the invention, neighboring nodes (e.g., NODE C and NODE F) monitor the traffic at the output ports 42 of the device 22, and provide the network load information to the device 22. In another embodiment of the invention, the device 22 includes traffic monitors adjacent to the output ports 42 that respectively monitor the traffic environments at the output ports 42, and provide the device 22 with the network load information. In another embodiment, the device 22 directly measures the output queue sizes and algorithmically calculates network load information.

In general, as packets arrive through the input ports 40, the data communications device 22 stores the packets in the arrival queue 46. The control circuit 44 operates to transfer the data from the arrival queue 46 to the output queues 50. The device 22 transmits packets within the output queues 50 through their respective output ports 42 back into the network 20. That is, the device 22 transmits data in the output queue 50-0 through the output port 42-0, data in the output queue 50-1 through the output port 42-1, and so forth.

As will now be explained in further detail with reference to FIG. 3, the multiple stages 24, 26 use the policy 52 and network efficiency information 54, which are stored in data structures within the memory 48, to control the manner in which the packets are transferred from the arrival queue 46 to the output queues 50.

When the data communications device 22 receives the policy 52 from the policy server (e.g., NODE H), the device 22 places the policy 52 in a policy table 66. Preferably, the policy table 66 is a multi-entry data structure in the memory 48 (e.g., an array, linked list, etc.). The policy 52 directs the manner in which the control circuit 44 chooses an output port 42, or orders packets awaiting transmission in the output queues 50.

Similarly, when the data communications device 22 receives the network efficiency information 54, the device 22 places the network efficiency information 54 in a network efficiency table 70. Preferably, the network efficiency table 70 is a data structure in the memory 48 (e.g., an array, linked list, etc.).

In one embodiment of the invention, the network efficiency information 54 includes network load information 74 describing the current traffic conditions at the output ports 40 of the device 22. As shown in FIG. 3 and in accordance with one embodiment mentioned above, traffic monitors 64-0, . . . , 64-N (collectively traffic monitors 64) respectively monitor these traffic conditions at the output ports 42 or the output queues 50, and provide the device 22 with the network load information 74. Alternatively, other nodes observe the neighboring traffic conditions and provide the network load information 74 to the device 22.

The data communications device 22 has the capability to operate based on other information in addition to the policy 52 and the network efficiency information 54. By way of example, the device 22 further receives network topology information 72 (e.g., from another node as similarly done for "link state algorithm" routers), formatted within packets, through the input ports 40 and stores the network topology information 72 in a network topology table 68.

The network topology information 72 preferably includes adjacent hop data and propagation delay data that describe the network from a topological perspective. The hop data describes the layout of the network 20. In one embodiment, the hop data indicates that the data communications device can reach NODE D through a path consisting of NODE B and NODE D, another path consisting of NODE C and NODE D, and so forth. The propagation delay data describes propagation delay characteristics of the network 20. In one embodiment, the propagation delay data includes overall propagation delays for paths extending from the device 22 (e.g., the propagation delay through the path consisting of NODE B and NODE D is 2 seconds). Alternatively, the propagation delay data includes incremental propagation delays for each node (e.g., the propagation delay through NODE F is 1 second, and through NODE G is 2 seconds such that the overall propagation delay through the path consisting of NODE F, NODE G and NODE D is 3 seconds).

In a manner similar to the policy table 66 and the network efficiency table 70, the network topology table 68 is a data structure that is preferably stored in the memory 48 (e.g., an array, linked list, etc.).

Figure 3:
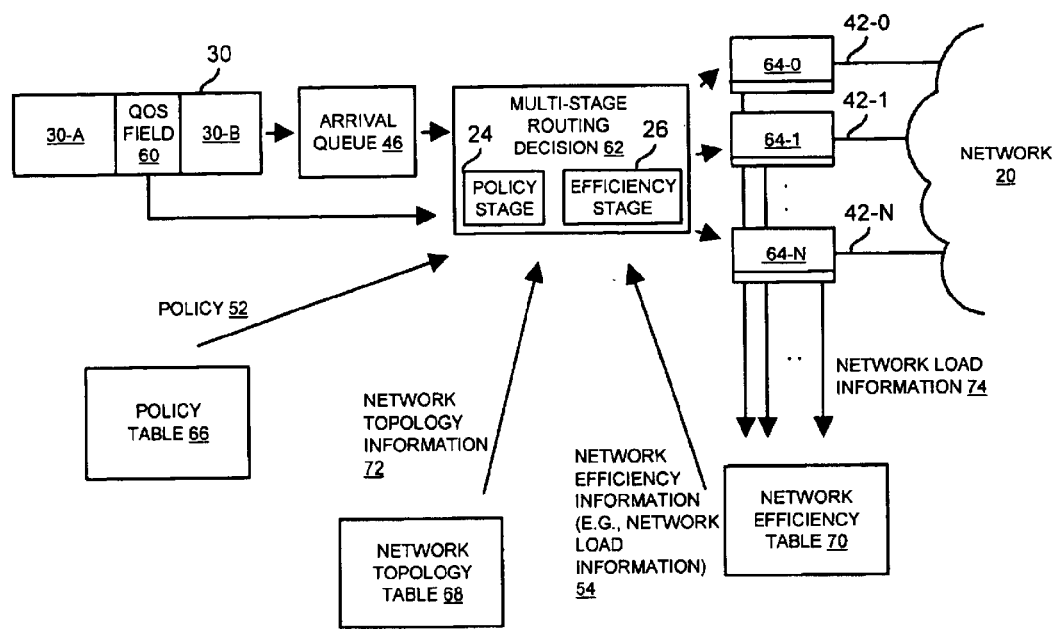
FIG. 3 is a logic flow diagram illustrating the flow of information for the data communications device of FIG. 1.

FIG. 3 illustrates the flow of a packet 30 within the device 22. When the device 22 receives the packet 30, the device 22 inspects a QoS field 60 (a bit field) of the packet 30. The QoS field 60 identifies a QoS class for data contained within the packet. The data is contained within another field (e.g., field 30-A). Network-related information other than the QoS class is preferably stored in the packet 30 as well. For example, field 30-B identifies the source (e.g., NODE A) and destination (e.g., NODE D) of the packet 30.

By way of example, if the packet 30 is an Internet Protocol (IP) packet, the type-of-service (TOS) field of the IP packet is suitable for use as the QoS field 60. Alternatively, another field that is separate and distinct with the (TOS) is used as the QoS field of an IP packet. This includes using the data itself (e.g., packet field 30-A) to determine the QoS class of the packet.

Once the network-related information (the QoS class, source, destination, etc.) is obtained from the packet 30, the device 22 temporarily stores the packet 30 in the arrival queue 46. The control circuit 44 chooses one of the output ports 42 through which to route the packet 30 based on the QoS class of the packet 30. In particular, if the packet 30 belongs to a best effort class or belongs to a previously established packet stream, the control circuit 44 simply transfers the packet 30 into an output queue 50 corresponding to a previously determined output port 42. Otherwise, the control circuit 44 makes a multi-stage routing decision 62 based on the policy 52, the network efficiency information 54 (e.g., the network load information 74 provided by the traffic monitors 64) and the network topology information 72. This decision 62 determines which output port 42 will be used to transmit the packet 30 back into the network. The device 22 then moves the packet 30 from the arrival queue 46 to an output queue 50 corresponding to the chosen output port 42. Finally, the device 22 transmits the packet 30 from that output queue 50 through the output port 42 back into the network 20 (e.g., to a high, medium or low traffic area as shown in FIG. 2).

Figure 4:
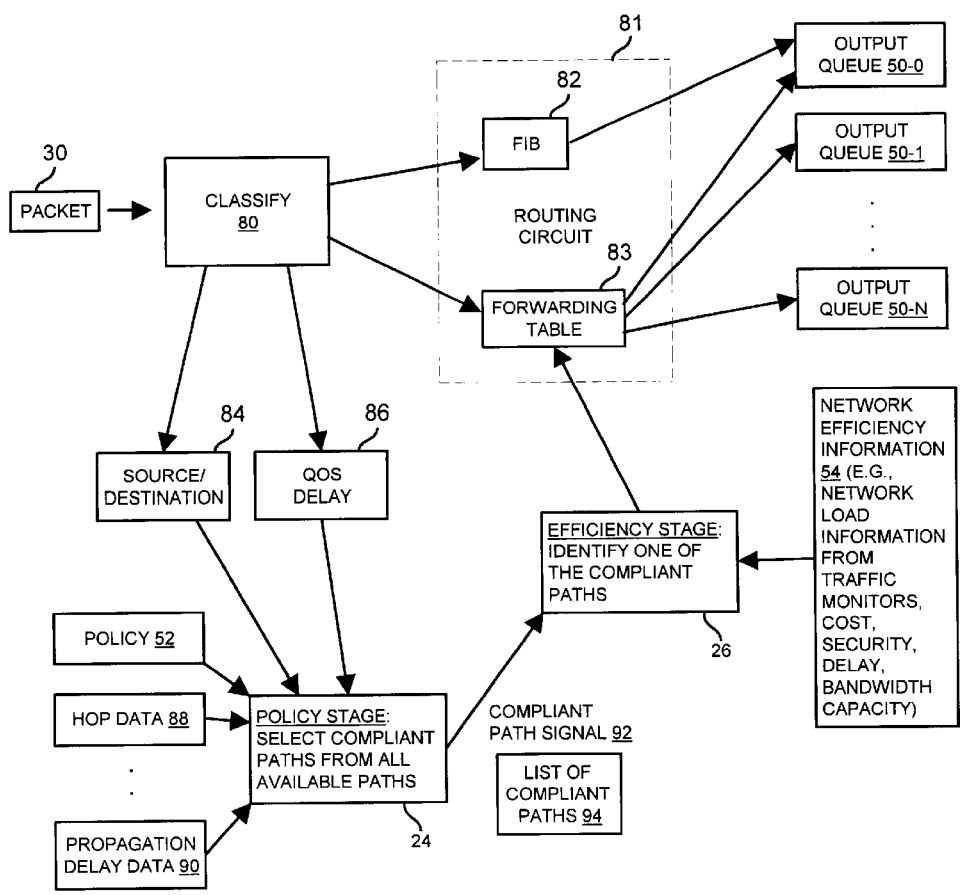
FIG. 4 is a logic flow diagram illustrating the flow of information for a multistage routing decision of FIG. 3.

Further details of operation of the control circuit 44 (in particular, the decision 62) will now be provided with reference to FIG. 4. The classification of the packet 30 is performed by a classify module 80 of the control circuit 44. If the packet 30 belongs to the best effort class or belongs to a previously established packet stream, the classify module 80 circumvents the multi-stage routing decision 62, and immediately passes control over the packet 30 to a routing circuit 81 of the control circuit 44.

The routing circuit 81 operates based on a forwarding information base (FIB) 82 and a forwarding table 83 in the memory 48. The FIB 82 is a data structure that is preferably stored in the memory 48. The FIB 82 directs how packets of the best effort class should be routed within the device 22. For example, if the packet 30 belongs to the best effort class, the routing circuit 81 places the packet 30 in a predetermined output queue (e.g., output queue 50-0) identified by the FIB 82 which circumvents the multi-stage routing decision 62. Such a best effort packet is not guaranteed delivery and may not reach its intended destination.

Similarly, the forwarding table 83 is a data structure that is preferably stored in the memory 48. The forwarding table 83 directs how packets that belong to a pre-established packet stream should be routed within the device 22. For example, if the packet 30 belongs to a previously established packet stream, a multi-stage routing decision has already been made for the packet 30. That is, the control circuit 44 already chose one of the output ports 42 (and corresponding output queue 50) by processing an earlier-received packet in the packet stream. The results of the multi-stage routing decision 62 were stored in the forwarding table 83, and the routing circuit 81 uses these results to transfer the packet 30 into the same output queue 50. Accordingly, the packet 30 circumvents the multi-stage routing decision 62 but benefits from a previously made multi-stage routing decision 62 of another packet of the same packet stream.

If the packet 30 does not belong to the best effort class and does not belong to a previously established packet stream, control of the packet 30 is determined by the multi-stage routing decision 62. In one embodiment, as shown in FIG. 4, the source and destination 84, and the QoS delay 86 are extracted from the packet 30 (e.g., bit fields 30-B and 60, see FIG. 3). Then, the policy stage 24 uses the extracted information, the policy 52 from the policy table 66, and the network topology information 72 from the network topology table 68 (e.g., hop data 88 and propagation delay data 90) to select a set of compliant paths from the data communications device 22 to the intended destination of the packet 30.

It should be understood that multiple paths may exist from device 22 to the packet destination. For example, to reach NODE D, the packet 30 may take paths CBD (i.e., NODE C, NODE B, and NODE D), CD, CFD, FCD, FD, FGD, etc. from the device 22. The policy stage 24 eliminates any of the available paths which will be unable to carry the packet 30 to its destination within the QoS policy constraint specified by the policy 52.

Suppose that the packet 30 is a video packet (a packet belonging to the video QoS class). In one embodiment, at least a portion of the QoS field 60 of the packet 30 includes, as the QoS delay 86, a delay bound (a maximum amount of time available for the packet 30 to reach its intended destination, i.e., source/destination 84). In this situation, the policy stage 24 analyzes the hop data (e.g., available paths to NODE D), the propagation delay data 90 (e.g., the delays through each path or node along each path), and the policy 52 (e.g., the port corresponding to output port 42-1 requires at least 50% general data packet bandwidth). The policy stage 24 eliminates any unsuitable paths, i.e., eliminates paths that do not comply with the policy constraint. For example, if the delay bound is 2 seconds, and total delay through path BHGD (NODE B, NODE H, NODE G and NODE D) is determined to be 3 seconds, the policy stage 24 considers path BHGD non-compliant. However, if path CD is determined to provide a total delay of 1 second, the policy stage 24 considers path CD to be a compliant path. As another example, if the output port 42-1 already provides 51% video packet bandwidth in violation of the policy requiring it to provide 50% bandwidth to general data packet, the output port 42-1 cannot be used to transmit the video packet 30.

As mentioned earlier, there are many policies and routing algorithms that can be accommodated by the policy stage 24. Additionally, such policies and algorithms can be modified and customized for the data communications device 22. In response the policies and algorithms, the policy stage 24 provides a list of compliant paths 94 (e.g., a data structure stored in the memory 48 or a compliant path signal 92) to the efficiency stage 26.

The efficiency stage 26 selects one of the compliant paths from the set of compliant paths on the list 94 based on the network efficiency information 54. In one embodiment, the network efficiency information includes the network load information 74 describing network traffic at the output ports of the device 22. Such load information 74 is used by the efficiency stage 26 when identifying a particular one of the compliant paths through which to send the packet 30. For example, suppose that path BD (through output port 42-1) and path CD (through output port 42-2) are both on the list of compliant paths. Further suppose that the load information 74 indicates that the network 20 is more congested at output port 42-1 (through which path BD passes) than that at output port 42-2 (through which path CD passes). The efficiency stage 26 could then select path CD over path BD in compliance of a network efficiency constraint.

There are many efficiency-related rules and routing algorithms that can be accommodated by the efficiency stage 26. Furthermore, such criteria can be modified and customized for the device 22. For example, if it is known that port 42-0 connects with a high delay network area (e.g., area 20-H in FIG. 1), port 42-1 connects with a medium delay network area (e.g., area 20-M in FIG. 1), and ports 42-(N−1) and 42-N connect with a low delay network area (e.g., area 20-L in FIG. 1), the efficiency rules direct the efficiency stage 26 to identify, as the particular path for routing the packet 30, a least-used path on the list of compliant paths 94 leading to the low delay area (e.g., port 42-N).

Once the efficiency stage 26 has identified one of the compliant paths from the list of compliant paths 94, the efficiency stage stores its selection in the forwarding table 83. In response, the routing circuit 81 transfers the packet 30 from the arrival queue 46 to the output queue 50 corresponding to the output port 42 through which the identified path passes, and the device 22 transmits the packet 30 from that output port 42 back into the network 20. As a result, the data communications device 22 routes the packet 30 by choosing an output port (the output port is effectively chosen by identifying a particular path from the device) while simultaneously satisfying both policy and network efficiency constraints.

Figure 5:
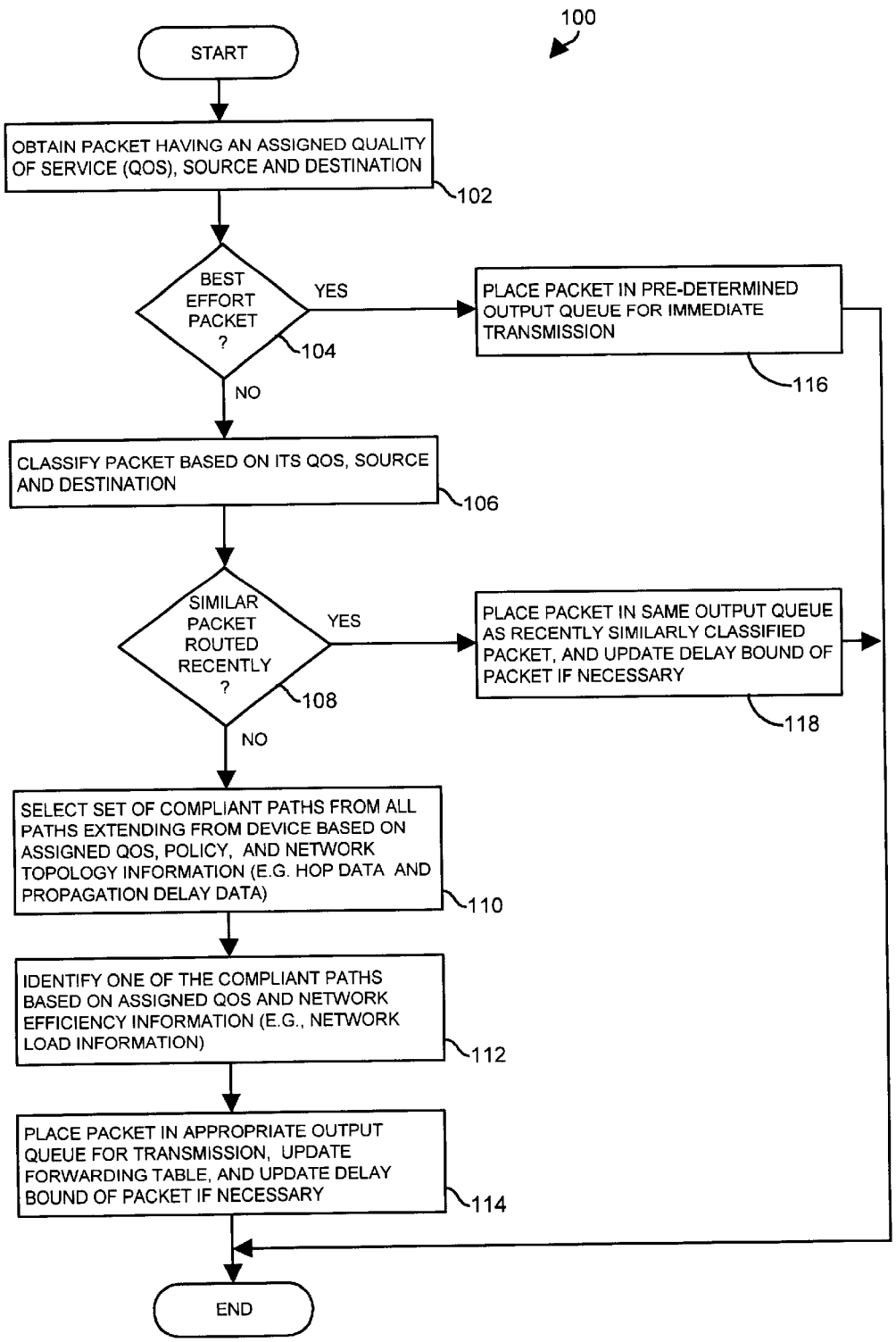
FIG. 5 is a flow chart illustrating the operation of the data communications device of FIG. 1.

FIG. 5 shows a flow diagram 100 summarizing and providing some further details of the operation of the data communications device 22. In step 102, the device 22 obtains a packet (e.g., packet 30) having an assigned QoS, source and destination information. Preferably, such information is obtained by scanning particular bit fields of the packet.

In step 104, the device 22 determines whether the packet belongs to the best effort class. If so, step 104 proceeds to step 116. Otherwise, step 104 proceeds to step 106.

In step 106, the device 22 further classifies the packet based on its associated QoS class, source and/or destination.

In step 108, the device 22 determines whether a similar packet (e.g., a packet of the same QoS class with the same source and destination) has been routed recently. If so, step 108 proceeds to step 118. Otherwise, step 108 proceeds to step 110.

In step 110, the device 22 (the policy stage 24) selects a set of compliant paths from all paths extending from the device 22 based on the assigned QoS, the policy 52, and preferably the network topology information 72 which includes hop data 88 and propagation delay data 90 (also see FIGS. 3 and 4).

In step 112, the device 22 (the efficiency stage 26) identifies one of the compliant paths based on the assigned QoS and the network efficiency information 54 (e.g., network load information 74).

In step 114, the device 22 updates the forwarding table 83 and transfers the packet to the appropriate output queue for transmission, i.e., the output queue corresponding to the output port through which the identified path passes. The device 22 then transmits the packet out the output port corresponding to that output queue. If the QoS field includes a delay bound for the packet, the device 22 updates the delay bound prior to transmitting the packet.

In step 116, when the packet belongs to the best effort class, the device 22 transfers the packet to a predetermined output queue for a predetermined output port (identified by the FIB 82, see FIG. 4), and the packet is then transmitted back to the network. Step 116 allows the packet to circumvent steps 106 through 114 (i.e., the multi-stage routing decision 62).

In step 118, when the packet belongs to a pre-established packet stream, the device 22 transfers the packet to the output queue corresponding to the output port used for a previous packet of the same packet stream, and the packet is transmitted out that output port back to the network. If the packet uses a delay bound, the device 22 updates the delay bound prior to transmitting the packet. Step 118 allows the packet to circumvent steps 110 through 114 (i.e., the multi-stage routing decision 62).

The invention enables the routing of data through one of multiple output ports of a data communications device by choosing an output port based on an associated quality of service of the data in order to satisfy a QoS constraint and a network efficiency constraint simultaneously. Accordingly, the device can support various QoS classes while concurrently balancing network traffic loads. Additionally, network resources are intelligently allocated and reserved to achieve the various Qualities of Service. Such features may be employed in data communications devices such as those manufactured by Cisco Systems, Inc. of San Jose, Calif.

EQUIVALENTS

While this invention has been particularly shown and described with references to preferred embodiments thereof, it will be understood by those skilled in the art that various changes in form and details may be made therein without departing from the spirit and scope of the invention as defined by the appended claims.

For example, the data communications device 22 may not be dedicated solely to data communications operations. The device 22 itself may be a host computer. Accordingly, it may operate as a packet-originating source or a destination for packets.

Furthermore, the transmission media 28 was described above as being physical network links (e.g., electrical or optical). Other types of transmission media are suitable for the invention as well. For example, the transmission media 28 may be wireless, or a combination of wireless and physical links. Furthermore, the wireless communications may be made through different frequencies. Accordingly, one output queue and corresponding output port can transmit on one frequency, another output queue and corresponding output port can transmit on another frequency, and so forth. As such, nodes (the data communications device 22) can be transmission signal relay stations, satellites, cellular base stations, etc.

Additionally, data was described as being transferred in packets by way of example only. Other data transmission forms are suitable for the invention such as multiplexing data in different time-slices, circuit-switching, etc.

Furthermore, it should be understood that QoS information other than QoS delay bound information is suitable for the QoS delay 86 (see FIG. 4). In an alternative embodiment, the QoS delay 86 is a bit field indicating a delay range for the packet 30. For example, x00000001 indicates that the packet 30 must route through a network path having network delays of less than 1 second, x00000010 indicates that the packet 30 must route through a network path having network delays of less than 2 seconds, x00000011 indicates that the packet 30 must route through a network path having network delays of less than 2 seconds but more than 3 seconds, and so forth. In this situation, the policy stage 24 considers paths that provide delays outside the specified delay range of the packet 30 to be non-compliant.

Another QoS criteria may be "jitter", i.e., the difference in time delays between adjacent packets in a packet stream. Accordingly, the QoS field 60 can include a jitter value that enables the data communications device 22 to determine time delays between such adjacent packets. In this situation and by way of example, the policy stage 24 selects, as compliant paths, only those paths that enable the packets to reach their intended destination within a predetermined jitter threshold amount relative to each other. Accordingly, between adjacent packets, there is no delay that exceeds the jitter threshold.

Furthermore, it should be understood that the efficiency stage 26 may identify one of the set of compliant paths on network efficiency information other than network load information or in addition to network load information. For example, such network efficiency information may include cost data, security information, delay and bandwidth capacity.

Additionally, it is not necessary for the policy stage 24 select compliant paths from all paths extending from the device 22. Rather, the policy stage 24 may be limited to selecting from those paths that terminate at intended packet destinations, at host computers, or at only certain paths on a list. Such features are intended to be within the scope of the invention.

Furthermore, in one embodiment, the elements of the control circuit 44 (e.g., the policy stage 24 and the efficiency stage 26) are implemented in hardware as actual circuits.

In another embodiment, the elements of the control circuit 44 are implemented with a combination of hardware and software using a processor that runs one or more specialized programs. In this hybrid arrangement, the one or more programs can be bundled with an operating system, such as with the Cisco Internetworking Operating System (Cisco IOS) manufactured by Cisco Systems, Inc. of San Jose, Calif. In one embodiment, the invention is directed to a computer program product that includes a computer readable medium having instructions stored thereon for routing data in a computerized data communications device having multiple output ports. The instructions, when processed by the computerized data communications device, cause the computerized data communications device to operate in accordance with the invention as described above (e.g., see FIG. 5). Such instructions preferably are bundled with the above-described operating system.

What is claimed is:

1. In a data communications device having multiple output ports, a method to support routing of data in a connectionless network system, the method comprising the steps of:

obtaining as the data, data packets from a network, each data packet having an associated quality of service;

classifying the data packets obtained from the network;

for each classified data packet, choosing one of the multiple output ports of the data communications device based on the associated quality of service of that classified data packet, a pre-established policy, and network traffic congestion information associated with network traffic through the multiple output ports; and transmitting each of the data packets to the network through a corresponding chosen one of the multiple output ports along a compliant network path, at least one of the data packets passing through the data communications device in a manner that circumvents a routing circuit configured to operate based on (i) a forwarding information base for forwarding best effort packets and (ii) a forwarding table for forwarding packets of a pre-established packet stream.

2. The method of claim 1 wherein the network traffic congestion information includes network load information describing network load environments at the multiple output ports, and wherein the step of choosing includes the steps of:

selecting, from a set of available network paths extending from the data communications device, a set of policy compliant network paths based on the associated quality of service of the data and the pre-established policy; and identifying one of the set of policy compliant network paths based on the associated quality of service of the data and the network load information, the chosen one of the multiple output ports being an output port through which the identified one of the set of policy compliant network paths passes.

3. The method of claim 2 wherein the data is obtained within a packet having a designated destination, and wherein each policy compliant network path extends from the data communications device to the designated destination.

4. The method of claim 2 wherein the data is obtained within a packet, and wherein each policy compliant network path is capable of carrying the packet in accordance with the associated quality of service.

5. The method of claim 1 wherein the data is obtained within a packet having a quality of service field, and wherein the step of choosing includes the step of:

scanning the quality of service field of the packet to determine the associated quality of service of the data.

6. The method of claim 1 wherein the step of choosing includes the step of:

choosing one of the multiple output ports of the data communications device based on network topology information including adjacent hop data and propagation delay data.

7. The method of claim 1, further comprising the step of:

receiving the pre-established policy from another data communications device in the network prior to the step of choosing.

8. The method of claim 1 wherein the network traffic congestion information includes network load information describing network load environments at the multiple output ports.

9. The method of claim 1, wherein the data is obtained within a packet, and wherein the method further comprises the step of:

obtaining another packet that is associated with a best effort quality of service, and transmitting the other packet through a predetermined one of the multiple output ports without regard for the pre-established policy and the network traffic congestion information.

10. The method of claim 1, wherein the data is obtained within a packet, and wherein the method further comprises the step of:

obtaining another packet that belongs to a pre-established packet stream, and transmitting the other packet through a predetermined one of the multiple output ports without regard for the pre-established policy and the network traffic congestion information.

11. The method of claim 1 wherein the step of choosing one of the multiple output ports of the data communications device includes the steps of:

selecting, from a set of paths extending from the output ports of the data communications device, a set of compliant paths from the set of paths, wherein each compliant path within the set of compliant paths carries data in accordance with the associated quality of service of the obtained data; and identifying one of the compliant paths from the set of compliant paths on which to forward the data packets based on the network traffic congestion information.

12. The method of claim 11 wherein the network traffic congestion information includes a respective network load value for each output port of the data communications device.

13. A method as in claim 1, wherein the step of obtaining the data packets includes obtaining data packets at an intermediate node of the network.

14. A method as in claim 13, wherein the step of obtaining the data packets at an intermediate node includes obtaining data packets that are transmitted from a source node to a destination node of the network.

15. The method of claim 1 wherein the step of classifying includes the step of classifying a first data packet and a second data packet, and wherein the step of choosing includes the steps of:

after the step of classifying, identifying one of the multiple output ports through which to send the first data packet; and after the step of classifying, identifying one of the multiple output ports through which to send the second data packet regardless of whether the first and second data packets belong to a same connection session.

16. The method of claim 15 wherein the first data packet and the second data packet belong to the same connection session; wherein the step of identifying one of the multiple output ports through which to send the first data packet includes the step of:

picking a first output port through which to send the first data packet; and wherein the step of identifying one of the multiple output ports through which to send the second data packet includes the step of:

picking a second output port through which to send the second data packet, the second output port being different than the first output port even though the first and second data packets belong to the same connection session.

17. A data communications device supporting routing of data in a connectionless network system, the data communications device comprising:

an input port that obtains the data as data packets from a network, each data packet having an associated quality of service;

multiple output ports; and a control circuit, coupled to the input port and the multiple output ports, that for each data packet, (i) chooses one of the multiple output ports based on the associated quality of service of the data, a pre-established policy, and network traffic congestion information associated with network traffic through the multiple output ports, and (ii) transmits each data packet to the network through a corresponding chosen one of the multiple output ports, the control circuit supporting transmission of at least one of the data packets to the connectionless network system through a corresponding chosen one of the multiple output ports, the at least one of the data packets passing through the data communications device in a manner that circumvents a routing circuit configured to operate based on (i) a forwarding information base for forwarding best effort packets and (ii) a forwarding table for forwarding packets of a pre-established packet stream.

18. The data communications device of claim 17 wherein the network traffic condition information includes network load information describing network load environments at the multiple output ports, and wherein the control circuit includes:

a policy stage that selects, from a set of available network paths extending from the data communications device, a set of policy compliant network paths based on the associated quality of service of the data and the pre-established policy; and an efficiency stage, coupled to the policy stage, that identifies one of the set of policy compliant network paths based on the associated quality of service of the data and the network load information, the chosen one of the multiple output ports being an output port through which the identified one of the set of compliant network paths passes.

19. The data communications device of claim 18 wherein the data is obtained within a packet having a designated destination, and wherein each policy compliant network path extends from the data communications device to the designated destination.

20. The data communications device of claim 18 wherein the data is obtained within a packet, and wherein each policy compliant network path is capable of carrying the packet in accordance with the associated quality of service.

21. The data communications device of claim 17 wherein the data is obtained within a packet having a quality of service field, and wherein the control circuit includes:

classifying circuitry that scans the quality of service field of the packet to determine the associated quality of service of the data.

22. The data communications device of claim 17 wherein the control circuit includes:

circuitry that chooses one of the multiple output ports of the data communications device based on network topology information including adjacent hop data and propagation delay data.

23. The data communications device of claim 17, further comprising:

memory that receives the pre-established policy from another data communications device in the network, and stores the pre-established policy within a policy table.

24. The data communications device of claim 17 wherein the network traffic congestion information includes network load information describing network load environments at the multiple output ports.

25. The data communications device of claim 17, wherein the data is obtained within a packet, and wherein the data communications device further comprises:

a routing circuit that obtains another packet that is associated with a best effort quality of service, and queues the other packet for transmission through a predetermined one of the multiple output ports without regard for the pre-established policy and the network traffic congestion information.

26. The data communications device of claim 17, wherein the data is obtained within a packet, and wherein the data communications device further comprises:

a routing circuit that obtains another packet that belongs to a pre-established packet stream, and queues the other packet for transmission through a predetermined one of the multiple output ports without regard for the pre-established policy and the network traffic congestion information.

27. The data communications device of claim 17 wherein control circuit is configured to:

select, from a set of paths extending from the output ports of the data communications device, a set of compliant paths from the set of paths, wherein each compliant path within the set of compliant paths carries data in accordance with the associated quality of service of the obtained data; and identify one of the compliant paths from the set of compliant paths on which to forward the data packets based on the network traffic congestion information.

28. The data communication device of claim 27 wherein the network traffic congestion information includes a respective network load value for each output port of the data communications device.

29. A data communications device as in claim 17, wherein the data communications device obtains the data packets at an intermediate node of the network.

30. A data communications device as in claim 29, wherein the obtained data packets are transmitted from a source node to a destination node of the network.

31. The data communications device of claim 17 wherein the control circuit, when choosing output ports and transmitting data packets, is configured to:

after classifying a first data packet, identifying one of the multiple output ports through which to send the first data packet; and after classifying a second data packet, identifying one of the multiple output ports through which to send the second data packet regardless of whether the first and second data packets belong to a same connection session.

32. The data communications device of claim 31 wherein the first data packet and the second data packet belong to the same connection session; wherein the control circuit is configured to identify a first output port through which to send the first data packet, and identify a second output port through which to send the second data packet, the second output port being different than the first output port even though the first and second data packets belong to the same connection session.

33. A data communications device for routing data in a connectionless network system, comprising:

an input port configured to couple to a data packet source, each data packet from the data packet source having an associated quality of service;

multiple output ports configured to couple to potential data packet targets;

means for classifying each data packet from the data packet source; means for choosing, for each data packet from the data packet source, one of the multiple output ports based on the associated quality of service of the data, a pre-established policy, and network traffic congestion information associated with network traffic through the multiple output ports, after that data packet has been classified; and means for transmitting each data packet to the network through a corresponding chosen one of the multiple output ports along a compliant path, at least one data packet passing through the data communications device in a manner that circumvents a routing circuit configured to operate based on (i) a forwarding information base for forwarding best effort packets and (ii) a forwarding table for forwarding packets of a Pre-established packet stream.

34. The data communications device of claim 33 wherein the means for choosing includes:

means identifying an output port for each classified packet regardless of whether the classified packets belong to a same connection session.

35. In a data communications device supporting packet-switched routing of data packets based on a multi-stage routing decision, a method for routing data comprising:

receiving a particular data packet having an associated quality of service, the particular data packet including destination information identifying a destination network node to which the particular data packet is destined;

at a first stage in the multi-stage routing decision:

classifying the particular data packet based on a quality of service and destination information associated with the particular data packet; and identifying a compliant set of available paths able to carry the particular data packet to the destination network node associated with the particular data packet in accordance with the associated quality of service;

at a second stage following the first stage of the multi-stage routing decision:

selecting a particular path from the compliant set of available paths on which to forward the particular data packet based on network traffic congestion information associated with the compliant set of available paths; and transmitting the particular data packet to the network node through a corresponding chosen one of the multiple output ports on the particular path, the particular data packet passing through the data communications device in a manner that circumvents a routing circuit configured to operate based on (i) a forwarding information base for forwarding best effort packets and (ii) a forwarding table for forwarding packets of a pre-established packet stream.

36. A method as in claim 35 further comprising:

monitoring traffic associated with the multiple output ports to generate the network traffic congestion information utilized in the second stage to select the particular path on which to forward the particular data packet.

37. A method as in claim 36, wherein selecting a particular path in the second stage further involves:

queuing the particular data packet in one of lesser used output queues, at least two of the multiple output queues having different associated delays for transmission of data packets over corresponding networks to a destination node.

38. A method as in claim 37, wherein monitoring traffic associated with the multiple output ports includes measuring fullness of corresponding multiple output queues associated with the multiple output ports.

39. A method as in claim 38, wherein selecting a particular path from the compliant set of available paths in the second stage includes:

selecting a least used path from the compliant set of paths on which to transmit the particular data packet to the destination network node.

40. A method as in claim 39 further comprising:

in addition to the particular data packet, obtaining a data packet associated with a best effort quality of service; and transmitting the data packet associated with a best effort quality of service through a predetermined one of the multiple output ports regardless of the network traffic condition information.

41. In a data communications device having multiple output ports, a method for routing data through the data communications device, the method comprising:

in a classification module of the data communications device, extracting source and destination information and a quality of service delay from a connectionless packet;

in a policy stage of the data communications device and based on the extracted source and destination information and the quality of service delay, generating a list of compliant paths from multiple paths which are capable of carrying the connectionless packet to a targeted destination, the list of compliant paths being generated by concurrently applying a policy from a policy table and network topology information from a network topology table, the network topology table providing hop data and propagation delay data to eliminate paths which are unable to carry the connectionless packet to the targeted destination within a quality of service policy constraint specified by the policy;

in an efficiency stage of the data communications device, selecting one of the compliant paths from the list of compliant paths based on network load information obtained from external traffic monitors disposed at the output ports to measure network load congestion at the output ports; and transmitting the connectionless packet out an output port associated with the selected one of the compliant paths, the connectionless packet passing through the data communications device in a manner that circumvents a routing circuit configured to operate based on (i) a forwarding information base for forwarding best effort packets and (ii) a forwarding table for forwarding packets of a pre-established packet stream.

* * * * *